United States Patent [19]

Wheeler et al.

[11] Patent Number: 4,673,268

[45] Date of Patent: Jun. 16, 1987

[54] PAN AND TILT MOUNT

[76] Inventors: Ernest E. Wheeler, 5938 Eton Ct., San Diego, Calif. 92122; David C. Wheeler, 7860 Dancy Rd., San Diego, Calif. 92126; William M. Wheeler, 5938 Eton Ct., San Diego, Calif. 92122

[21] Appl. No.: 861,925

[22] Filed: May 12, 1986

[51] Int. Cl.⁴ ............................................. G03B 17/00
[52] U.S. Cl. .................................. 352/243; 248/183; 354/293; 354/81
[58] Field of Search ...................... 248/183; 352/243; 354/293, 81

[56] References Cited

U.S. PATENT DOCUMENTS 3,164,838  1/1965  Heinrich ............................. 354/293
4,233,634  11/1980  Adams .................................. 352/243

Primary Examiner—Monroe H. Hayes
Attorney, Agent, or Firm—Frank D. Gilliam

[57] ABSTRACT

The invention is directed to a highly accurate remote positionable pan and tilt mount for a television camera or the like. The pan and tilt portions are rotated by stepping motors. The pan portion can be continuously rotated in either direction through 360°.

14 Claims, 6 Drawing Figures

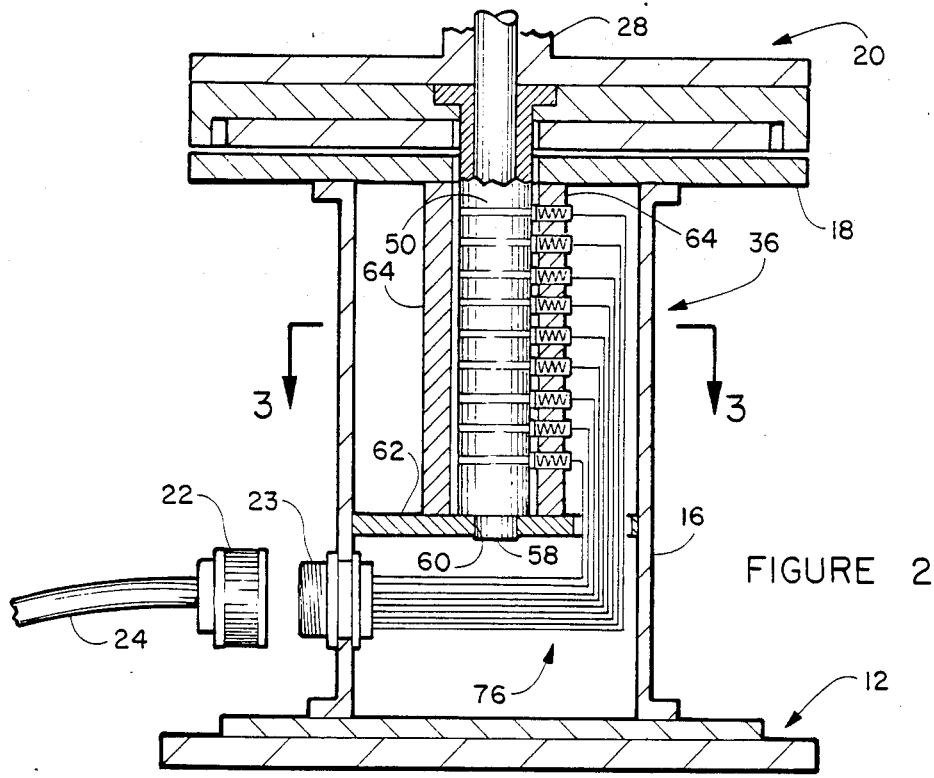
FIGURE 2
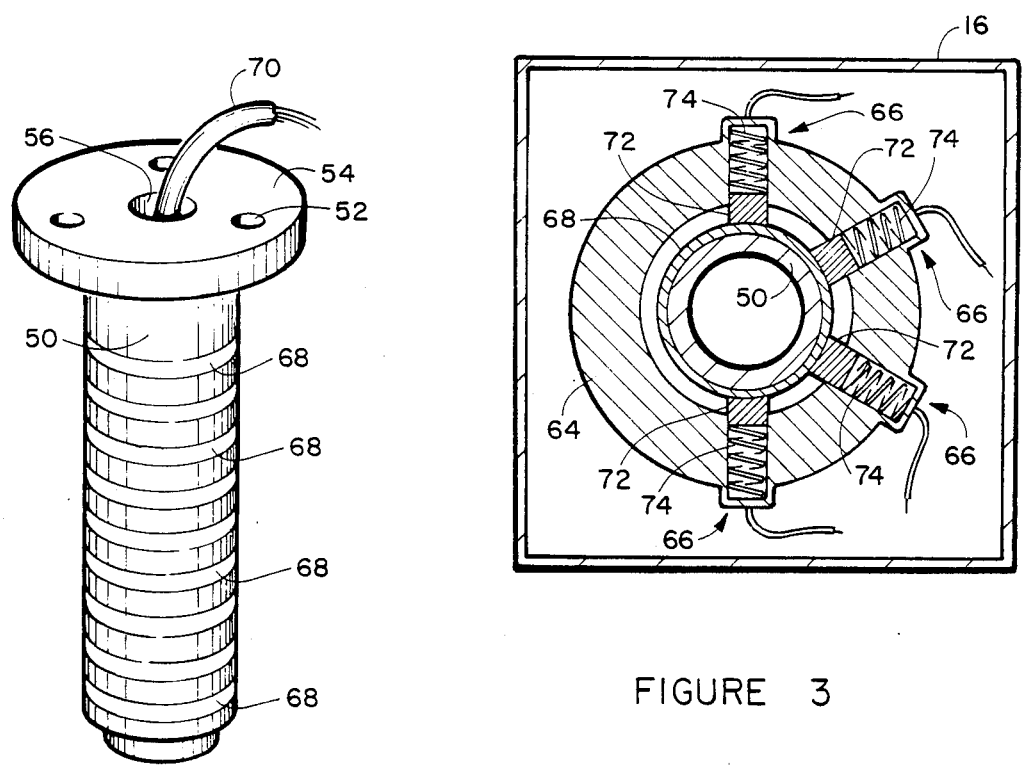
FIGURE 3
FIGURE 4

PAN AND TILT MOUNT

BACKGROUND OF THE INVENTION

The invention is directed to pan and tilt mount mechanisms and more particularly to a pan and tilt mount that is remotely operated with precision positioning and repositioning.

The prior art, other than manually operated device, generally consists of pan and tilt mount mechanisms which are remotely operated by reversable D.C. shunt motors or A.C. Servomotor systems.

U.S. Pat. No. 3,164,838 issued to E. L. Heinrich teaches the use of reversable D.C. shunt motors. The pan portion does not rotate through 360° and as a result must necessarily reverse itself every 350°. 10° or rotation is not available for panning. This device is not capable of accurate precise movement, the holding of a precise location when movement is terminated or the capability of returning to an erect rotational location.

The servomotor pan and tilt systems are a considerable improvement over the D.C. shunt motor system; however, the main draw back is the high economical cost of producing a servomotor system. This system is capable of position accuracy of within ½ of a degree or arc, but has very poor rotational speed control. This system is not capable of a pan rotation through 360° of travel in any one direction.

A major problem of the currently existing pan and tilt mounts is the inability to pan through 360° of continuous rotation. In these systems the electric cables interconnecting the remotely positioned controls are continuously dragged back and forth as the pan continues to reverse its direction of rotation when one end of its path or travel is reached. In a short period of time the cables and their connectors require repair or replacement.

The requirement for a highly accurate positionable pan and tilt mount the pan portion of which is capable of 360° of rotation, a positioning and repositioning accuracy of 1/100 of a degree of rotation has existed for a number of years and this need has continued to exist until the emergence of this invention.

SUMMARY OF THE INVENTION

The invention is directed to a remote operable pan and tilt mount for a television camera or the like which is capable of 360° of pan rotational in either direction, accurately positionable and repositionable to a selected 1/100 of a degree of arc in either pan or tilt rotational position, has accurate rotational speed control through a wide range of operational speeds, has good starting and running torque and can be remotely operated manually or by computer control.

The object of the invention is to provide a pan and tilt mount that can be remotely operated and has a pan rotation of 360° in either direction or rotation.

Another object of the invention is to provide a pan and tilt mount that is selectively positionable and repositionable to within 1/100 of a degree of arc.

Another object of the invention is to provide a slip ring connector between the pan and tilt mount and the remote controls therefore.

Still another object of this invention is to provide a slip ring connector between the television camera or the like carried by the pan and tilt mount and its remotely positioned operating controls.

Still another object of this invention is to eliminate wear on the interconnecting cables and connectors to reduce premature repair and/or replacement.

Yet another object of this invention is to provide a highly accurate positionable pan and tilt mount for a television camera or the like which is reasonably inexpensive to produce.

How the above objects of the invention are attained, as well as others not specifically mentioned herein, will be more readily understood by reference to the following description and the attached drawings, in which:

BRIEF DESCRIPTION OF THE DRAWINGS

FIG. 2 is a cutaway side sectional showing of the base portion of FIG. 1;

FIG. 3 is a cutaway view taken along line 3—3 of FIG. 2;

FIG. 4 is a perspective elevated view of the slip ring assembly of FIG. 2;

DETAILED DESCRIPTION

Figure 1:
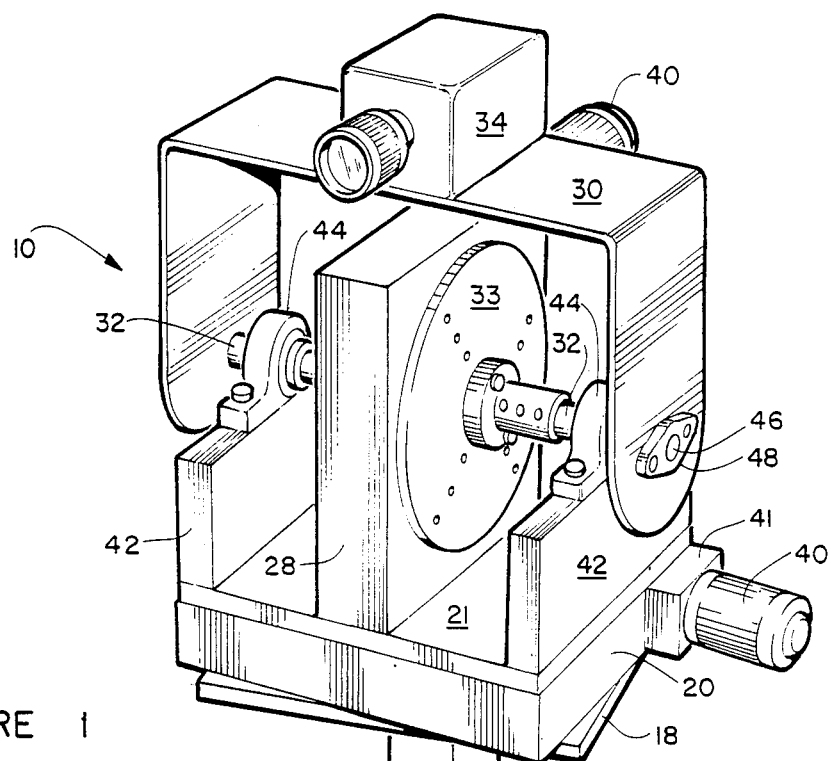
FIG. 1 is a perspective view in elevation of the pan and tilt mount of the invention.

Referring now to FIG. 1 of the drawings, there is shown a preferred form of the present invention. The pan and tilt mount 10 of the invention comprises a mounting base 12; supported by legs 14 the lower ends of which are secured to a suitable permanent object not shown; tubular strut 16 is connected at its bottom end to the base 12 and at its upper end to a mounting platform 18; a motor driven pan table 20 is attached to the platform 18, a portion of which is rotatable relative thereto; a connector 22 to which a cable 24 is attached extends through the wall 26 of the tubular strut 16, the purpose of which is hereinafter discussed in specific detail; a motor driven tilt table 28 is attached to the upper rotatable surface of the pan table 20 in a perpendicular relationship thereto; a tilt platform 30 is attached through a shaft 32 to the rotatable portion of the tilt table 28; and a television camera or the like 34 is mounted on the tilt platform 30 and is positionable therewith.

The mounting base 12, and legs 14 may be constructed of any material suitable to accomplish the purpose of the invention. Metal, plastic, wood and the like may be used having various load considerations in mind. The legs 14 may be attached directly to the earth, attached to a building, a tower or various other object which will provide substantially vibration free support thereto.

The strut 16 is tubular in cross-section. The strut 16 is shown to be rectilinear and it should be understood that the strut could also be circular in cross-section or any other configuration which would provide ample support for the device shown. The only limitation is that the strut 16 be hollow and suitable to receive a rotatable brush assembly 36 hereinafter discussed in more detail. The mounting platform 18 rotatably supports the motor driven pan table 20. The strut 16 is welded or otherwise attached at its lower end to the base 12 and is provided additional support by a plurality (four shown) of upright angle braces 38. The angle braces 38 are attached to the base and strut in the same manner as the strut to base connections.

The motor driven pan table 20 may be a series 21000 or 21200 motor driven table manufactured by Daedal Inc. or any equivalent thereto. The motor driven pan table is driven by a stepping motor 40 which may be a Superior Electric model MO62-D-421 or an equivalent thereto.

A motor driven tilt table 28 is attached to the upper rotatable surface of the motor driven pan table 20 through plate 21 in a perpendicular position thereto. The attachment means between the motor driven pan table 20 and the motor driven tilt table 28 may be any convenient means such as, for example, bolts, cap screws, welding or the like. Also positioned and attached to the motor driven pan table in the same manner as the motor driven tilt table 28 are a pair of upright supports 42. The motor driven tilt table 28 is centered on the upper rotatable surface of the motor driven pan table 20 and the upright supports 48 are equally spaced therefrom in a parallel manner with one at each outer edge or the motor driven pan table.

The motor driven tilt table 28 may be a series 20802 manufactured by Daedal, Inc. or any equivalent thereto. The motor driven tilt table is driven by a stepping motor 40, the manufacturer and model hereinbefore mentioned.

Passing through the center of the motor driven tilt table is the shaft 32. The shaft 32 is attached to the rotatable portion 33 of the tilt table and rotates therewith. The shaft to tilt table attachment may be in any convenient manner. The shaft 32 is supported adjacent each of its distal or outer ends by pillow bearing supports 44. Each bearing support includes a shaft adjacent pillow bearings. Any convenient pillow bearings may be employed. One example of such a pillow bearing is a model VPS-110 manufactured or distributed by W. W. Grainger.

The stepping motors 40 are mounted to their associated motor driven tables by a convenient mount 41 model 20802-RTRMH manufactured by Daedal, Inc. The tables include a rotary gear model 20802-R6 which is driven by the stepping motor through a model 208025G worn gear shaft both are manufactured by Daedal, Inc. (neither are shown). It should be understood that this is just an example of gears used to rotate the tables and that any equivalent gears may be used to practice this invention. The only requirement is that the gears have a high degree or accuracy which allows accurate movement within 1/100 of a degree.

Supported at the distal ends of shaft 32 is a U shaped tilt platform 30. The platform is fixedly attached to the shaft by means of a bolt 46 passing through an end plate 48. The bolt 46 is threaded into the end of the shaft and tightened to prevent relative rotation between the shaft and platform.

As aforementioned, a television camera or the like is attached to the upper surface of the platform 30 and rotates therewith.

Referring now to FIGS. 2-4 in detail. FIG. 2 depicts a side cut-away view of the tubular strut 16. The motor driven pan table 20 is shown attached to mounting platform 18 through table support 12. Centrally located is a slip ring member 50. Slip ring member 50 is attached to the rotatable portion of the pan table 20 by aperture 52 in its enlarged head 54. A central opening 56 extends through the center of the slip ring member. The bottom end 58 of the slip ring member is held in vertical alignment by an aperture 60 in bottom support member 62. Vertical support member 64 maintains the slip ring member associated brush assemblies 66 in position.

A plurality of spaced apart slip rings 68 are fixedly attached to slip ring member 50. These slip rings are constructed of silver, bronze, copper, platinum, gold or the like which are good electrical conductors. Each of the slip rings 68 is attached to a different wire associated with wire bundle or harness 70 which extend and are connected to the stepping motors and television camera or the like for remote operation thereof. Each slip ring 68 mates with a plurality of parallel wired brushes 72, four shown for each slip ring. More or less brush may be employed to practice this invention. The purpose of multibrushes will be hereinafter explained. The brush assemblies 66 include the brush 72 and bias spring 74. The brushes and springs are conventional in the art and need no further explanation. Each parallel grouping of brushes are wired through wire bundle or harness 76 to the female connector 23 which extends through the wall of strut 16. Male connector 22 on the end of wire bundle or hardness 24 mates with connector 23.

As motor driven pan table 20 is rotated the slip ring member rotates relative to the stationary brush assemblies. As a result, any electrical signals on the slip rings via wire bunch or cable 70 is transferred to the wire bunch or cable 24 via the brushes. This feature allows the pan table 20 to rotate through 360° of continued rotation. If desired, the pan table 20 could continue to rotate in either direction of rotation indefinitely.

Figure 5:
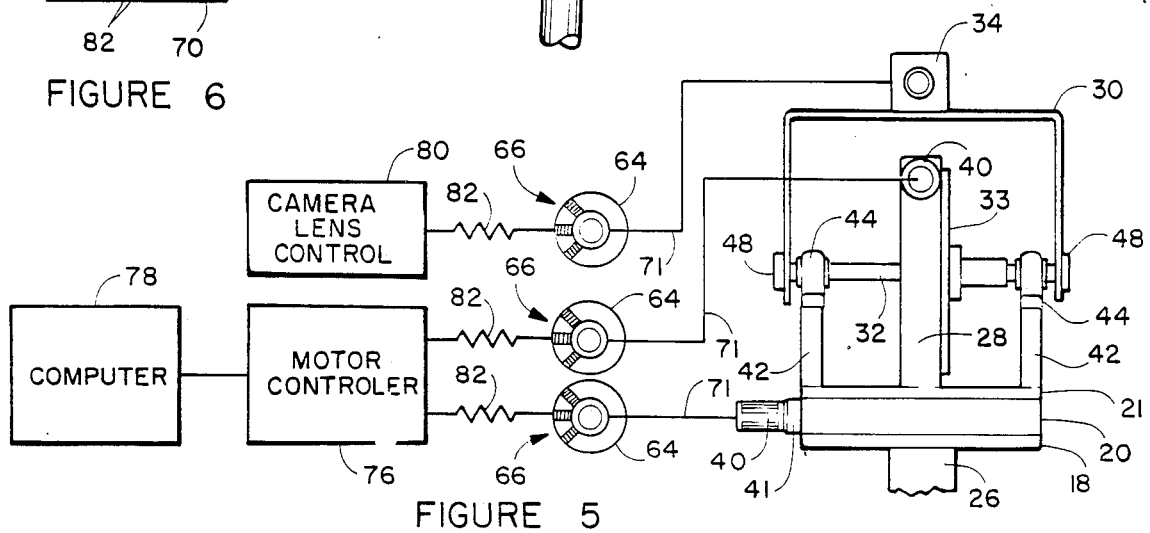
FIG. 5 is a block showing of the stepping motor and camera controls.

Referring now to FIG. 5. This Fig. is a block schematic showing of the invention along with remote controllers therefor. The step motors can be stepped manually by means of a programmable motor controller 76 Series PC-400 manufactured by Daedal, Inc. or automatically by a computer 78 of the PC or apple type. The operation of the motor controller 76 and interactions of the computer 78 is explained in detail in the operation manual of the motor controller. The television camera and remote controller 80 may be a model 4TE44-CP manufactured by General Electric. It should be understood that any television camera and controller as well as any other device and its controller may be used in place thereof.

In operation, for example, the motor controller manually commands a step voltage and frequency to be applied to the stepping motor depending on speed of movement and torque desired. For example, the pan step motor can be constantly rotating and the tilt table can be positioned or re-positioned independently. The stepping motor can be stopped at any location a specific number of "steps" from the home or start position, can be moved to a different location and then returned to the first moved position or home position and returned. The computer can be programmed to move the table through any sequence of positions of rotation.

Each slip ring is associated with a plurality of parallel brush assemblies so that brush noise, poor or lack of contact by any one or more brushes associated with one slip ring will not effect the operation of the pan tilt mount movements or the operation of the television camera or the like.

It has been found that a pan and tilt mount according to this invention has a smooth continuous 360° of operation, has an accuracy of 1/100 of an arc of position control, can rotate 360° in approximately 7 seconds, has repeatability of position of 0.3 arc minutes or 1/100 of a degree of arc, has the ability to travel one increment of 1/100 of a degree of arc or any minutes thereof on command, when stopped holds its position and can maintain their highly accurate operation over prolonged periods of time estimated to be in excess of 5000 hours.

Figure 6:
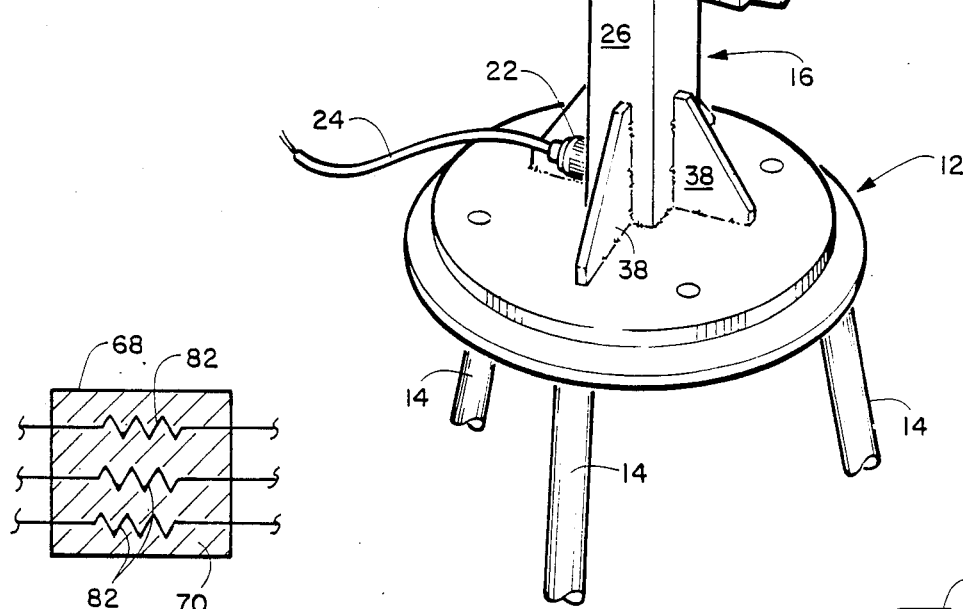
FIG. 6 is a perspective showing of several power resistors and temperature maintaining means.

Referring now to FIGS. 5 and 6, as most motor controllers have an output signal voltage level higher than required by most stepping motors power dropping resistors 82 are employed to lower the output voltage to prevent damage to the stepping motors. This type of resistor has close resistance tolerances within their operating temperature range. If this operating temperature range is exceeded the resistance changes and the life of the resistors are shortened. It has been found, that with continuous pan and tilt mount operation as described herein that the power resistors will exceed their rated operation temperatures after a short operation time. To prevent resistance changes during operation and to prolong the life of this resistor they are housed in an oil tight container 68 which is filled with either transformer oil or a wax 70 which liquifies at a low ambient temperature. Typical heat sink fins can be added to the external surface of the container if desired.

Since it is obvious that many changes and modifications can be made in the above described details without departing from the nature and spirit of the invention, it is to be understood that the invention is not limited to the details described herein except as set forth in the appended claims.

What is claimed is:

1. A pan and tilt mount comprising:
   a fixed in position support member;
   a horizontal oriented pan assembly rotatably connected to said support member;
   a stepping motor for driving said pan assembly through 360° of rotation through a range of 0.0001 to 0.05 degree steps in either direction of rotation;
   a vertical oriented tilt assembly carried by said horizontal oriented pan assembly and rotatable therewith;
   a stepping motor for driving said tilt assembly through at least 270° of rotation in either direction;
   a remote stepping motor controller means for controlling the rotation of said stepping motors;
   a rotatable connector means intermediate said remote stepping motor controller means and said stepping motors, and
   a platform means connected to said tilt mount and rotatable therewith.

2. The invention as defined in claim 1 wherein said fixed in position support member comprises a base support member with a tubular member extending between said base support member and said horizontal oriented pan assembly.

3. The invention as defined in claim 1 additionally comprising a television camera fixedly connected to said platform means and remote control means interconnected to said television for control thereof.

4. The invention as defined in claim 3 wherein said fixed in position support members comprises a base support member with a tubular member extending between said base support member and said horizontal oriented pan assembly.

5. The invention as defined in claim 1 wherein said rotatable connector means comprises a plurality of slip rings rotatably carried by said horizontal oriented pan assembly which engage a plurality of brushes fixedly positioned relative to said supported member.

6. The invention as defined in claim 2 wherein said rotatable connector means comprises a plurality of slip rings rotatably carried by said horizontally oriented pan assembly which engage a plurality of brushes fixedly positioned relative to said support member.

7. The invention as defined in claim 5 wherein each of said slip rings engage a plurality of interconnected brushes.

8. The invention as defined in claim 6 wherein each of said slip rings engage a plurality of interconnected brushes.

9. The invention as defined in claim 1 wherein said remote stepping motor controller means comprises a programmable motor controller, a computer and at least one voltage dropping resistor for each of said stepping motors, said computer is interconnected to said stepping motor controller to command the output voltage signals from said stepping motor controller, said at least one voltage dropping resistor is connected between the output voltage signal from said stepping motor controller and said rotatable connector means.

10. The invention as defined in claim 3 wherein said rotatably connector means comprises a plurality of slip rings rotatably carried by said horizontal oriented pan assembly which engages a plurality of brushes fixedly positioned relative to said support member.

11. The invention as defined in claim 10 wherein each of said slip rings engage a plurality of interconnected brushes.

12. The invention as defined of claim 9 wherein said at least one voltage dropping resistor is submerged in a liquid coolant to maintain a predetermined operation temperature.

13. The invention as defined in claim 12 wherein said liquid coolant is transformer oil.

14. The invention as defined in claim 12 wherein said liquid coolant is wax having a low melting temperature.

* * * * *